US011438338B2

(12) United States Patent
Gulbrandsen

(10) Patent No.: US 11,438,338 B2
(45) Date of Patent: Sep. 6, 2022

(54) CORE NETWORK ACCESS PROVIDER

(71) Applicant: Magnus Skraastad Gulbrandsen, Fagerstrand (NO)

(72) Inventor: Magnus Skraastad Gulbrandsen, Fagerstrand (NO)

(*) Notice: Subject to any disclaimer, the term of this patent is extended or adjusted under 35 U.S.C. 154(b) by 193 days.

(21) Appl. No.: 16/491,843

(22) PCT Filed: Mar. 8, 2018

(86) PCT No.: PCT/EP2018/055846
§ 371 (c)(1),
(2) Date: Sep. 6, 2019

(87) PCT Pub. No.: WO2018/162687
PCT Pub. Date: Sep. 13, 2018

(65) Prior Publication Data
US 2020/0412731 A1    Dec. 31, 2020

(30) Foreign Application Priority Data

Mar. 9, 2017    (EP) ..................... 17160170

(51) Int. Cl.
*G06F 16/23* (2019.01)
*H04L 9/40* (2022.01)
(Continued)

(52) U.S. Cl.
CPC ........ *H04L 63/102* (2013.01); *G06F 16/2365* (2019.01); *G06F 21/64* (2013.01);
(Continued)

(58) Field of Classification Search
CPC . H04L 63/102; H04L 63/0876; H04L 9/0643; H04L 9/3247; H04L 9/3236;
(Continued)

(56) References Cited

U.S. PATENT DOCUMENTS

| 2008/0004949 | A1* | 1/2008 | Flake | .............. G06Q 30/02 |
| | | | | 705/14.69 |
| 2016/0182519 | A1* | 6/2016 | Gulbrandsen | .......... H04W 4/24 |
| | | | | 726/4 |

OTHER PUBLICATIONS

Benshoof Brendan "Distributed Decentralized Domain Name Service," IEEE International Parallel and Distributed Processing Symposium Workshops, May 23, 2016 (May 23, 2016), pp. 1279-1287 (Year: 2016).*

(Continued)

*Primary Examiner* — Khoi V Le
(74) *Attorney, Agent, or Firm* — Knobbe, Martens, Olson & Bear, LLP

(57) ABSTRACT

A computer-implemented method of providing nodes, such as data structures and devices, with access to a network is disclosed, and a corresponding network architecture. At least one core network access provider controls real time access to the network across the layers of a protocol stack for the network, and sequentially assigns a network communication address to the or each access-requesting node. The assigned network address is encoded with a unique parameter of the node and a unique parameter of the node user, in a sequential identifier ledger which is distributed in real time to all of the network-connected nodes. Each node processes the ledger to verify its sequential integrity and, upon determining a sequential integrity loss, the ledger record causing the loss is identified and an alert comprising the identified record is broadcast to the nodes across the network. The core network access provider cancels network access for the node to which the network communication address corresponding to the identified ledger record was assigned, upon either identifying the ledger record at the verifying step or receiving an alert.

17 Claims, 10 Drawing Sheets

(51) Int. Cl.
*G06F 21/64* (2013.01)
*H04L 9/06* (2006.01)
*H04L 9/32* (2006.01)
*H04L 61/5076* (2022.01)

(52) U.S. Cl.
CPC .......... *H04L 9/0643* (2013.01); *H04L 9/3247* (2013.01); *H04L 61/2076* (2013.01)

(58) Field of Classification Search
CPC ............. H04L 61/2076; H04L 2209/38; G06F 16/2365; G06F 21/64; G06F 21/30; G06F 21/604; G06F 21/62
See application file for complete search history.

(56) References Cited

OTHER PUBLICATIONS

Benshoof et al., "Distributed Decentralized Domain Name Service" 2016 IEEE International Parallel and Distributed Processing Symposium Workshops, IEEE May 23, 2016, pp. 1279-1287.
Ouaddah et al., "FairAccess: A New Blockchain-based Access Control Framework for the Internet of Things: FairAccess: A New Access Control Framework for IoT" Security and Communication Networks, vol. 9, No. 18, Dec. 1, 2016, pp. 5943-5964.
International Search Report and Written Opinion for International Application No. PCT/EP2018/055846 dated May 22, 2018, in 8 pages.

* cited by examiner

ＵＳ 11,438,338 B2

CORE NETWORK ACCESS PROVIDER

FIELD

The present invention relates to a system and method for managing access of data processing devices to networks. More particularly, the present invention relates to systems and methods for managing access of data processing devices to networks through a distributed ledger integrating address protocol and identity attributes of users.

BACKGROUND

Computing devices in permanent or semi-permanent networked use nowadays, extend far beyond the conventional computers and laptops of yesteryear, to personal communication terminals such as smartphones, industrial and domestic appliances, personal vehicles and many other devices including even toys, all commonly referred to as 'things' in the expression 'Internet of Things', wherein their aggregate number has increased over the relatively short time span of two to three decades, from tens to hundreds of thousands to now several tens of millions at least, in parallel with the deployment of quasi-ubiquitous network connectivity.

The pace of this development remains ever increasing, to the extent of the total number of computing devices in networked use at any given time soon, or already, comfortably exceeding the human population simultaneously using them.

Two problems that are inherently related to one another, arise from this situation. Firstly, at any particular node of a network, that of establishing at a relevant time, and maintaining over a period of time, a level of confidence about the identity of a user associated with a remote node, be it a computer connected to the Internet, a fridge likewise connected to the Internet, a smartphone connected to a cellular network, or an individual software-as-a-service session on either platform. Secondly, considering the ever-increasing number of network nodes associated with any particular individual, that of scaling up this level of confidence across multiple networks operating under different protocols and having widely-varying authentication requirements and capacities.

Recent attempts at mitigating the above quandary have relied upon block chain-based technologies, which are known to consume non-trivial amounts of computer processing power for verification purposes, and which exhibit limited flexibility for adaptation to varying application contexts. Further, the inherently anonymous design of the Internet results in indifferent neutrality of the technology in the case of node-oriented solutions: in the TCP/IP protocol, the data sender is potentially anonymous, and the intelligence is in the nodes, not in the network, for purposes of resilience, convenience and effectiveness. This design structure prevents network-wide authentication, requiring session-specific authentication instead, for instance using the Transport Layer Security protocol.

Research for technological solutions to the above problems is routinely ongoing outside the administrative context of identity control and individual or national security considerations. This disconnection between the digital realm and administrative constructs such as borders, nationalities and other jurisdictional rules, results in non-trivial governmental resources dedicated to network data auditing and surveillance for security purposes, because it is still highly impractical to try and enforce user accountability and borders in digital networks.

Authentication, accountability and compliance monitoring are prerequisites for creating a stable, predictable and secure environment. A scalable network architecture apt to authenticate and monitor user, device and/or data structure identity, rather than defer the task to discrete entities ad hoc, is therefore desirable in view of the above.

SUMMARY OF THE INVENTION

The present invention relates to a network architecture incorporating ledgers and systems for information, communication, transaction integrity and security, which is implemented by a methodology carried out by one or more core network access providers (CNAP) interfaced with all the layers, including the lowest layers of infrastructure in a communication network for controlling users access to the ledgers and systems and interaction, wherein one of the ledgers integrates a distributed ledger of identities of nodes, systems and communication addresses with address protocol and identity attributes of a user or node. The present invention relates to an architecture and operating-system enabling design of systems, networks and ledgers with rights and policy enforcement for information, communication, transaction, identity and access integrity and security using the different layers of infrastructure in a communication network and attached systems, networks and ledgers to control the use of the systems, networks and ledgers, The method is carried out by the core network access provider (CNAP) systems used for permissioned access to trusted systems that all can interoperate with other platforms, applications, ledgers and networks.

According to an aspect of the present invention therefore, there is provided a computer-implemented method of providing each node of a network with access to the network (and network based system or systems that run on, or are attached to the network, and/or to any other nodes connected to the network) wherein the network comprises at least one protocol stack comprising a plurality of layers, the method comprising the steps of controlling real time access to and activity on the network of each layer of the protocol stack by at least one core network access provider, wherein the core network access provider comprises at least one digital and/or physical entity; sequentially assigning a network communication address to the or each access-requesting node at the core network access provider; encoding the assigned network communication address at the core network access provider with a unique parameter of the node and a unique parameter of the node user, in an integrity identifier ledger; distributing the integrity identifier ledger in real time to each network-connected node; receiving the distributed identifier ledger and processing same at each network-connected node or one or more certified nodes to verify it integrity related to all relevant aspects; upon determining a loss of integrity in the ledger, identifying the ledger record causing the loss and broadcasting an alert comprising the identified ledger record to each network-connected node or one or more certified nodes; and upon either identifying a ledger record causing a loss of integrity or receiving an alert at the core network access provider, cancelling or controlling access to the network and its connected nodes and systems for the node having the identifier corresponding to the identified ledger record or the node that has taken the communication address. The integrity related to all relevant aspects may comprise its sequential, identity factor and process integrity. In one embodiment this could be monitored or any of the other functionalities in the CNAP or other attached system capabilities. In one embodiment, the core network access provider is configured for receiving computer programs and information containing conditions controlling access to different systems and intelligence on operational requirements and use of these CNAP capabilities. In one embodiment the distribution of the integrity identifier leger in real time to each network-connected node is to CNAPs with certification, a group of users/nodes pre-set by the system specification (e.g. a group of banks), or each network connected node. In one embodiment the verification of integrity further comprises an ability to immediately detect a change or a breach in user identification attributes (e.g. Identity/IP/machine code) and react according with the pre-set system of the node (such as a CNAP blocking of the breached user or an access database blocking or restricting a user). In one embodiment, one or more certified nodes may be alerted if a node is identified as lacking in integrity.

The method of invention advantageously combines and integrates a distributed transparency ledger technology, the communication layer and identifiable attributes inherent in a communication network, and devices and systems connected to it, to secure identification and make any change in the status immediately visible to the participating nodes of the ledger. The ledger is operated by, and accessed through globally, one or more core network access providers, the whole or parts of which can be managed by common platforms controlled by multiple players or a single institution.

With the methodology of the invention, core network access providers have, or can gain, full control of the nodes across the physical and virtual network and its capabilities and functions. Systems and ledgers wherein access is managed from a core network access provider can be specified and enforced in all participating networks across a wide area network like the Internet, as the access system implemented by each core network access provider to the ledger or system is granted. Each core network access provider is used as a central point of authenticating access, because they are adapted to control the physical and virtual functions of the network and its use whereby, even though core network access providers cannot control a whole wide area network like the Internet, they can control the use of its systems. They can also control its users and the terms of which a user can be given access to the network, systems and ledgers or parts of it. Through this, a user's access to the whole wide area network can be controlled from the user's CNAP. As more and more CNAPs comply with different systems, network and ledger conditions, the different systems integration and enforcement spread across an increasing number of users and an increasing geographical area.

The method of invention thus advantageously sets a standard in a network within a wider network, wherein authentication can be forced and a secure key breach notification installed for proper accountability and integrity across all communications. The foundational network architecture and capabilities of a core network access provider, the access technology to ledgers and systems and the features of the ledger of the present invention, all result in a network architecture which permits ease of scalability and implementation, increased flexibility and interoperability between different systems and ledgers. The ledger and CNAP verify integrity in sequence and integrity in all registered identity attributes (cryptologically, physically, digitally, or other attributes etc). This will make it impossible to change the status of the ledger and the id without it becoming apparent to the nodes with access to the ledger. This communication related to the distribution of the ledger and alert of an identity breach can use dedicated systems and/or circuit switched networks that are encrypted and have guaranteed message delivery.

In an embodiment of the method, the step of sequentially assigning the network communication address preferably further comprises matching at least one unique parameter of the data structure or device/hardware and/or at least one unique parameter of the data processing device user with one or more predetermined access parameters. The or each predetermined access parameter may advantageously be selected from the group comprising global positioning system (GPS) coordinates, geographical coordinates of network interfacing points, IP addresses or autonomous system numbers issued by regional internet registries (RIR), session keys or authorisation tokens issued by application service providers (ASP).

Preferably, the underlying reality of e.g. a MAC address, an IP address and other static or semi-static technological identifiers is cryptographically derived, synthesized, hashed and/or attached to a virtual identifier, so that a potential change in the physical network protocol, socket address, port number, or other data structure corresponding to such relevant information shall be visible on the ledger. Accordingly, in an embodiment of the method, the step of encoding preferably further comprises hashing the encoded network communication address, node unique parameter and node user unique parameter, and wherein the integrity identifier ledger is a block chain data structure. In an alternative embodiment of the method, the step of encoding may instead, or also, comprise the further step of processing the assigned network communication address into a digital signature or a digital key. In an alternative embodiment of the method, the hash is cryptographically attached to the underlying physical communication address and/or other identity attributes and a change in the underlying reality will destroy the hash and be alerted on the ledger.

Preferably, a core network access provider should be certified for operation, and thus the grant or prevention of access to the network or its systems, if it is compliant with the specific technological and administrative conditions for use of systems connected to the network, applicable both to the core network access provider and the network nodes. Different systems can require different conditions for a core network access provider to be accepted. Such conditions can relate to one or more distinct functions of one or all of a core network access provider's capabilities, available to control its network and the use of it by its nodes. Some system may require a core network access provider to deploy of all its resources to control, enhance or stop functionality and activities on the network.

Accordingly, an embodiment of the method may comprise the further step of certifying at least one network-connected node as a second core network access provider according to a list of predetermined core network access provider attributes selected from hardware attributes, software attributes, communication attributes and a ruleset.

Some system may also, or alternatively, implement or defer the certification task to a plurality of already-certified core network access providers as a voting requirement, in which that plurality must vote to approve, and thereby certify, a new core network access provider. The enforcement of nodal integrity and system enforcement across a network and its subdivisions advantageously increases, as the number of certified core network access providers complying with cumulative conditions of the various network systems increases.

Accordingly, in an embodiment of the method including the further step of certifying, upon the network comprising a plurality of core network access providers, the step of certifying a network-connected node as a further core network access provider preferably further comprises a step of voting to certify the node at each of the plurality of core network access providers. In one embodiment the voting system among the node or CNAP comprises where the new CNAP must be approved by a number of, or all, the existing CNAPs.

An embodiment of the method including the further step of certifying may comprise the further step of geo-locating each core network access provider.

An embodiment of the method including the further step of certifying may comprise the further step of decertifying a core network access provider when it fails to uphold one or more attributes of the list of predetermined core network access provider attributes of the systems, networks and ledgers the CNAP must be compliant with. In one embodiment this further step may comprise cancelling access for the CNAP and its nodes/users by an automatic technological process related to the computer program that constitutes the ledger or system and that function in all the CNAPs that is certified for the system or ledger.

According to another aspect of the present invention, there is also provided a system comprising at least one protocol stack comprising a plurality of layers; at least one core network access provider operably interfaced with each layer of the protocol stack and configured for receiving information on systems, subnetworks and ledgers attached to the network and to control real time access of nodes to the network and their activity on the network, wherein the core network access provider comprises at least one digital and/or physical entity; one or more nodes connected to the network, wherein the or each node is sequentially assigned a network communication address by the core network access provider when requesting network access; and an integrity identifier ledger comprising, for each node, the assigned network communication address encoded therein with a unique parameter of the node and a unique parameter of the node user, wherein the integrity identifier ledger is distributed to each network connected node in real time; wherein the or each core network access provider and each node is further configured to process a received ledger to verify its integrity, identify a ledger record causing a loss of integrity, broadcast an alert comprising the identified ledger record across the network; and wherein the or each core network access provider is further configured to cancel or control access to the network or specific systems or other nodes for the node having lost its integrity e.g. by having the network communication address corresponding to the identified ledger record. In an embodiment the at least one core network access provider interfaced with each layer of the protocol stack is configured to control real time access of nodes to the network and control the nodes possible activities on the network. In an embodiment, if there is dissonance with the underlying nodes identity, an alert is sent on the ledger. A change in identity can be detected by a CNAP or directly in the ledger.

In an embodiment of the system, the or each core network access provider may be further configured to verify the accuracy of one or more unique parameter(s) of each node user, wherein a maximum number of network communication addresses assignable by the or each core network access provider in the network is equal to a number of identities verified thereat.

In another embodiment of the system, the or each core network access provider may be further configured to process each network communication address assigned to a node into a digital signature or a digital key.

In any of the embodiments of the method and system disclosed herein, the or each unique parameter of a node is preferably selected from the group comprising a media access control (MAC) address, an international mobile equipment identity (IMEI) code, a mobile equipment identifier (MEID) code, an electronic serial number (ESN), an Android_ID hex string or other type of identifier enabling hardware to communicate on a network.

In any of the embodiments of the method and system disclosed herein, the or each unique parameter of a node user is preferably selected from the group comprising global positioning system (GPS) coordinates, biometric data, a personal identification number (PIN), a password, a passport serial number, a universally unique identifier (UUID) or any other type of identifier that can identify a user.

According to another aspect of the present invention, there is also provided a data structure comprising at least one network communication address, at least one unique parameter of a network node and at least one unique parameter of the network node user, for use with the methodology disclosed herein, and in the network architecture disclosed herein (a) The CNAP, (b) its communication, registration and processing database/server (300), (c) all the CNAP capabilities, (d) external systems, networks, databases, ledgers and other connected systems and nodes, (e) the user identity ledger. This provides the framework for designing systems, networks and ledgers that can be registered and implemented into the CNAP for all these components and attached systems to operate according to the design of the system. The receiving and processing database in the CNAP (300) is configured for external communication, can register, store, update and run computer programs that interface with all the above mentioned capabilities and external systems and ledgers. The databases (300) has an operating-system that enable data programs/systems to utilize all the internal and external capabilities. The operating system comprises a communication configuration, a program/system registration, implementation and update system, an information processing unit, and interface with all the capabilities and systems to execute (e.g. access and blocking conditions) a registered program/system. The CNAP 300 provide an intelligence hub that can easily deploy and update systems implying functions across networks, systems and ledgers and through different layers of technological means. The system/program design (requirements and conditions) is implemented via a data program into the CNAP (300) to operate the CNAP capabilities to provide the support for the system that is required, and designed, by the system owner. (e.g. governments, companies, organizations, people, consortiums etc.) To secure unified performance and compliance with the programs across networks related to the systems, networks and ledgers designed to run on the operating-system of the CNAP 300, the operating-system and/or the programs running on it can be made fully or partly open source so that all changes are distributed to all certified nodes. The CNAP 300 module can also be made fully or partly transparent so that the other certified CNAPs can control the actual real time operation and communication of the different systems. The program can also be designed to only function the intended way or to self-destruct if it is tampered with. A third party, a group of nodes or other independent system can also manage the program for the CNAPs. A certified CNAP and its users must be in constant compliance with the program/system to have access. The program may be designed so that the pre designed system is automatically enforced so that the neither the CNAP nor the users can breach the conditions of the system without automatically losing access. The CNAP registers and enforces the systems/programs through its capabilities and interface with external units to comply with the different programs/systems and different users. The identifier ledger system can function so that the CNAP cannot assign addresses for communication without registering the user on the ledger. The process and all attributes related to the ledger and its underlying information can be made transparent to all certified nodes. Any breach is distributed on the ledger as it happens. The nodes with access to information about the ledger can be regulated in the System/program (e.g. only certified CNAPs, groups of nodes and databases, all connected nodes including all users). The CNAP is the gatekeeper, intermediate to multiple networks, systems and ledgers with different access and operational conditions providing the intelligence for the systems, networks and ledgers function and communication. The potential design of the programs/systems that can be implemented in the CNAP 300 increase as the CNAP, its capabilities and connected systems increase. These systems inter operate through the identity ledger and the CNAP 300 operating-system. CNAP secures integrity in authentication and access between systems, networks, users on both sides. This enables an increasing system and network design opportunities that can utilize the capabilities of the CNAP. Networks, systems and ledgers within the network (WAN) can be designed for different users. The networks, systems and ledgers can interoperate through the CNAP, the id ledger and externally connected systems. Thus, the id ledger and the CNAP provide a platform for interoperation between systems, ledgers, applications and subnetworks connected to the network. The present invention thus provides an interface for receiving and storing programs and systems, with requirements and parameters for use and access on the network and its connected systems, subnetworks and ledgers. According to an aspect of the present invention therefore, there is provided a computer-implemented method of providing each node of a network with access to the network (and network based system or systems that run on, or are attached to the network), comprising the steps of controlling real time access to the network across layers of its protocol stack with at least one core network access provider; sequentially assigning a network communication address to the or each access-requesting node at the core network access provider; encoding the assigned network communication address at the core network access provider with a unique parameter of the node and a unique parameter of the node user, in a sequential identifier ledger; distributing the sequential identifier ledger in real time to each network-connected node; receiving the distributed identifier ledger and processing same at each network-connected node to verify its sequential integrity; upon determining a loss of sequential integrity, identifying the ledger record causing the loss and broadcasting an alert comprising the identified ledger record to each network-connected node; and upon either identifying a ledger record causing a loss of sequential integrity or receiving an alert at the core network access provider, cancelling access to the network for the node having the network communication address corresponding to the identified ledger record or the node that has taken the IP. According to another aspect of the present invention, there is also provided a network architecture comprising at least one protocol stack; at least one core network access provider interfaced with each layer of the protocol stack and configured to control real time access of nodes to the network; one or more nodes connected to the network, wherein the or each node is sequentially assigned a network communication address by the core network access provider when requesting network access; and a sequential identifier ledger comprising, for each node, the assigned network communication address encoded therein with a unique parameter of the node and a unique parameter of the node user, wherein the sequential identifier ledger is distributed to each network connected node in real time; wherein the or each core network access provider and each node is further configured to process a received ledger to verify its sequential integrity, identify a ledger record causing a loss of sequential integrity, broadcast an alert comprising the identified ledger record across the network; and wherein the or each core network access provider is further configured to cancel access to the network for the node having the network communication address corresponding to the identified ledger record.

Other aspects of the present invention are as stated in the appended claims.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

Figure 1:
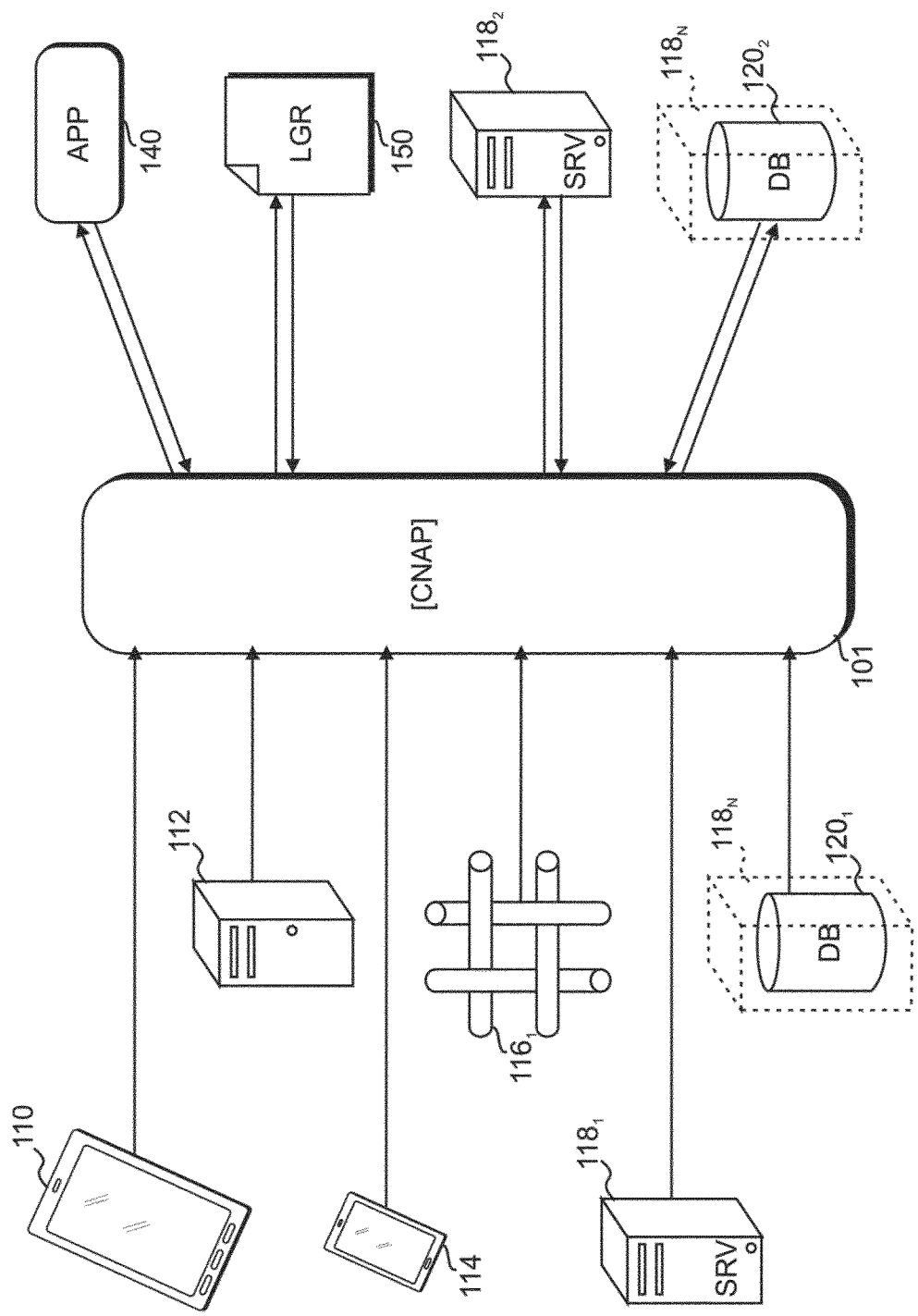
FIG. 1 is a logic representation of a network architecture according to an embodiment of the invention, including a plurality of nodes connected to a core network access provider.

In the following description, for purposes of explanation, specific details are set forth in order to provide an understanding of the invention. It will be readily understood by the skilled reader that the inventive principles disclosed herein may be practiced without incorporating these specific details, and that embodiments of the present invention may be variously implemented as a process, an apparatus, a system, a device, or a method on a tangible computer-readable medium.

Components and/or modules shown in diagrams are illustrative of exemplary embodiments of the invention and are shown and described to facilitate understanding of the inventive principles disclosed herein. It will be readily understood by the skilled reader that such components and/or modules may be implemented as separate components or integrated to a smaller or larger extent, including within a single system or component; such components and/or modules may be implemented in software, hardware or a combination thereof; and that functions or operations described herein may be implemented as components.

References in the specification to connections between components, modules, systems or devices within the figures are not intended to be limited to direct connections, but may extend to indirect connections through one or more intermediary devices, wireless connections, and additional or fewer connections may be used. References in the specification to messages, blocks and data, relate to a group of bits capable of communication across a network. These terms should not be interpreted as limiting embodiments of the present invention to any particular configuration, and may be interchangeably used or replaced with such terms as data traffic, information, and any other terminology referring to a group of bits. References in the specification to an embodiment, means that a particular feature, structure, characteristic, or function described in connection with that embodiment may be featured in more than one embodiment.

References in the specification to "users" may be taken to mean persons, organizations, businesses, groups, households, systems, ledgers, applications, databases, servers, networkable devices and other identifiable things or groups with means to communicate over a communication network. References in the specification to a "block chain" may be taken to mean a record of a defined number of digital assets, digital signatures, identities and transfers between identities that is registered and hashed into an unbroken chain of blocks that is published to all participating identities, moreover wherein double spending is prevented by a verification of the sequence of transactions by the majority computer processing power in the network which verifies the longest chain of transactions. References in the specification to a "distributed ledger" may be taken to mean a register of users and digital assets published to all participating nodes. References in the specification to an "air gap" may be taken to mean a physical, virtual, mathematical or cryptographical or system-defined barrier that cannot be overcome by means of connection to an electronic data network.

References in the specification to a "Core Network Access Provider" ('CNAP' herein) may be taken to mean at least one digital and/or physical entity providing access to the network for new nodes and their users, and controlling the maintenance of that access for connected nodes through capabilities apt to affect the functionality of a network for a connected node. References in the specification to "capabilities" of a CNAP extend at least to access, accounting, billing, authentication, management, control of physical infrastructure and cables, link layer, IP layer, store and execute preset communication paths by physical cables, IP routing schemes, link layer control, surveillance, deep package inspection, domain name systems blocking, analytical tools of data-streams and behavior, decryption, and any other functionality capable of effecting the capabilities and functionality of a network or parts of a network.

Figure 2:
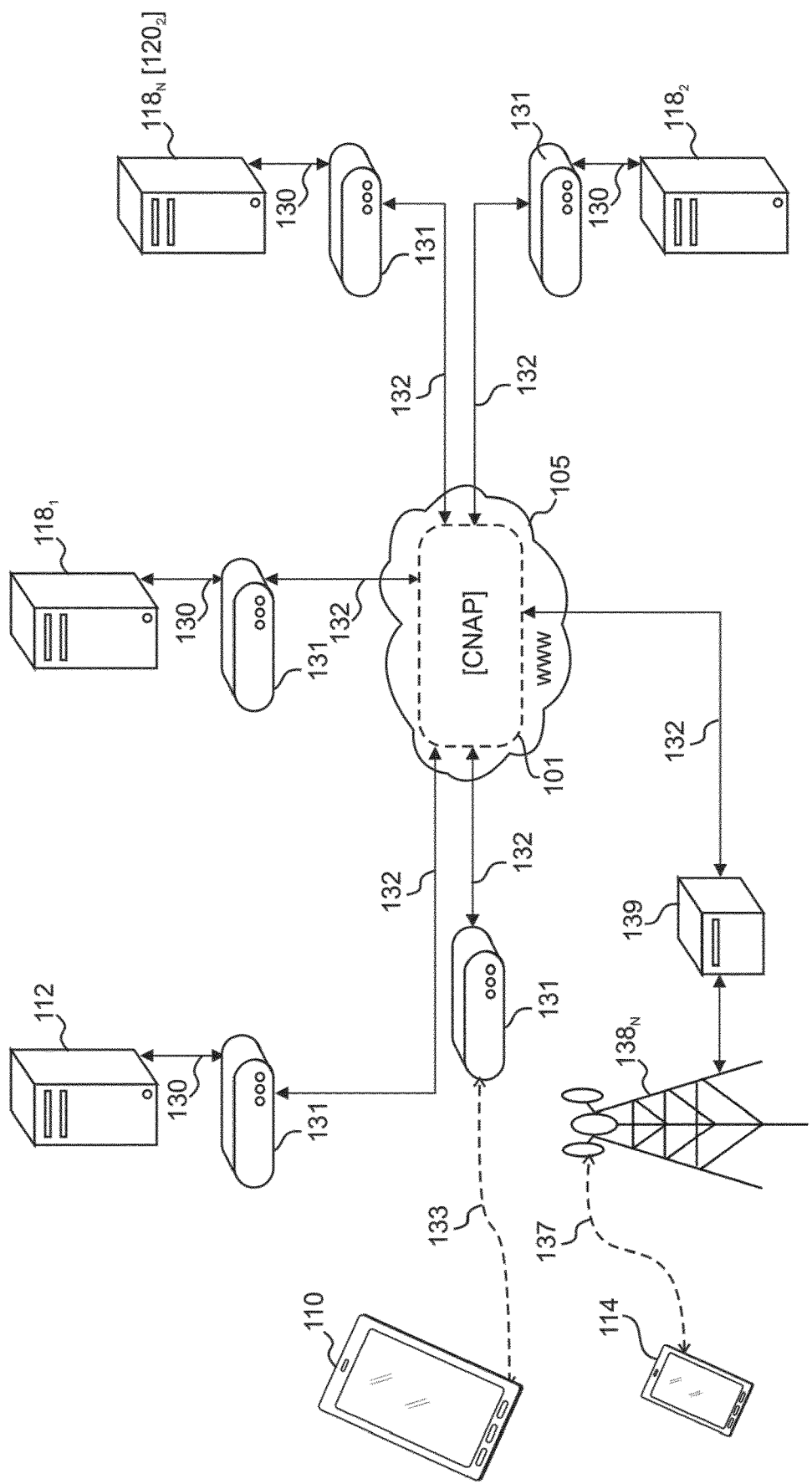
FIG. 2 is a logic representation of the network of FIG. 1, deployed within a wide area network.

Referring now to the figures and initially FIGS. 1 and 2, there is shown a logic representation of a network architecture according to an embodiment of the invention, including a plurality of nodes connected to a core network access provider (CNAP) 101.

FIG. 1 illustrates functionally the network gate-keeping function of the CNAP 101 for a variety of access-requiring nodes illustrated variously as a tablet computer 110, a desktop computer 112, a smartphone 114, a network 116, a first server $118_1$ and a first database $120_2$ stored at a further terminal $118_N$ on the left side, to grant access to different remote systems and ledgers, illustrated variously as an connected application 140, a second server $118_1$, a second database $120_2$ stored at a second server $118_2$ and including an identifier ledger 150, on the left side.

FIG. 2 shows the same network as FIG. 1, deployed as portions of a broader wide area network, in the example the Internet 105, and respectively connected thereto through a variety of network protocols, wherein network connectivity and interoperable networking protocols of each terminal allow the terminals to connect to one another and to communicate data to, and receive data from, one another according to the methodology described herein.

Within the WAN 105, the network architecture may comprises any number of sub-networks 132 operably interfaced with the CNAP 101. In the network architecture, the CNAP 101 is adapted to authenticate every access-requesting node 110, 112, 114, $118_N$ connecting to the core network, and each of the CNAP 101 and every authenticated node 110, 112, 114, $118_N$ granted access is adapted to monitor the continuing authenticated status of every connected node.

A type of data processing terminal 110 in the network architecture may be a mobile personal computer terminal operated by a user, and in the example is a tablet computer 110. The tablet computer 110 emits and receives data encoded as a digital signal over a wireless data transmission 133 conforming to the IEEE 802.11 ('Wi-Fi™') standard, wherein the signal is relayed respectively to or from the tablet computer by a local router device 131 interfacing the tablet computer 110 to the WAN communication network 105. The tablet computer 110 further comprises a High Frequency Radio Frequency Identification (RFID) networking interface implementing Near Field Communication (NFC) interoperability and data communication protocols for facilitating wireless data communication over a short distance with correspondingly-equipped devices such as the mobile phone 110 and/or an NFC-enabled device of the user, for instance an electronic payment card. The tablet computer the tablet computer 110 may for instance be an iPad™ manufactured by Apple, Inc. of Cuppertino, Calif., USA or a Surface™ manufactured by Microsoft, Inc. of Redmond, Wash., USA.

Another type of data processing terminal 114 in the network architecture may be a mobile personal communication device, operated by the same user of the mobile personal communication device 110 or alternatively by another, operated by a user. The terminal 114 emits and receives data, including voice and/or alphanumerical data, encoded as a digital signal over a wireless data transmission 137, wherein the signal is relayed respectively to or from the device 114 by the geographically-closest communication link relay 138 of a plurality thereof. The plurality of communication link relays $138_N$ allows digital signals to be routed between mobile devices like the user terminal 114 and their intended recipient by means of a remote gateway 139. Gateway 139 is for instance a communication network switch, which couples digital signal traffic between wireless telecommunication networks, such as the network within which wireless data transmissions 137 take place, and the WAN 105. The gateway 139 further provides protocol conversion if required, for instance if the terminal 114 uses a Wireless Application Protocol ('WAP') or Secure Hypertext Transfer Protocol ('HTTPS') to communicate data.

Further types of data processing terminal s in the network architecture may be desktop personal communication devices 112 and servers $118_N$ operated by respective users for personal or administrative purposes. All such terminals emit and receive data, including voice and/or alphanumerical data, encoded as digital signals over wired (132) or wireless (137) data transmissions, wherein the signals are relayed respectively to or from each terminal by a local router device 131 interfacing the computer 112, $118_N$ to the WAN communication network 105.

Still further types of data processing terminal s in the network architecture may be network-connectable purpose-specific devices commonly referred to as 'things', variously including home appliances and home automation interfaces in domestic contexts, surveillance cameras and location access controlling interfaces, industrial automation interfaces and more. Depending both on their purpose and networking protocol configuration and compatibility, such device may be network-connectable through a wired or wireless connection to the wide area network 105 or to a local area network $116_N$ interfaced with the wide area network 105, in either case through the CNAP 101.

The core network is maintained by the CNAP 101 which, in the example, is embodied at a computer terminal such as a server $118_N$. The CNAP emits and receives data encoded as a digital signal over a wired data transmission 130, wherein said signal is relayed respectively to or from the server by a local router device 131 implementing a wired local network operating according to the IEEE 802.3-2008 Gigabit Ethernet transmission protocol. The router 131 is itself connected to the WAN 105 via a conventional optical fibre connection over a wired telecommunication network 132.

Figure 3:
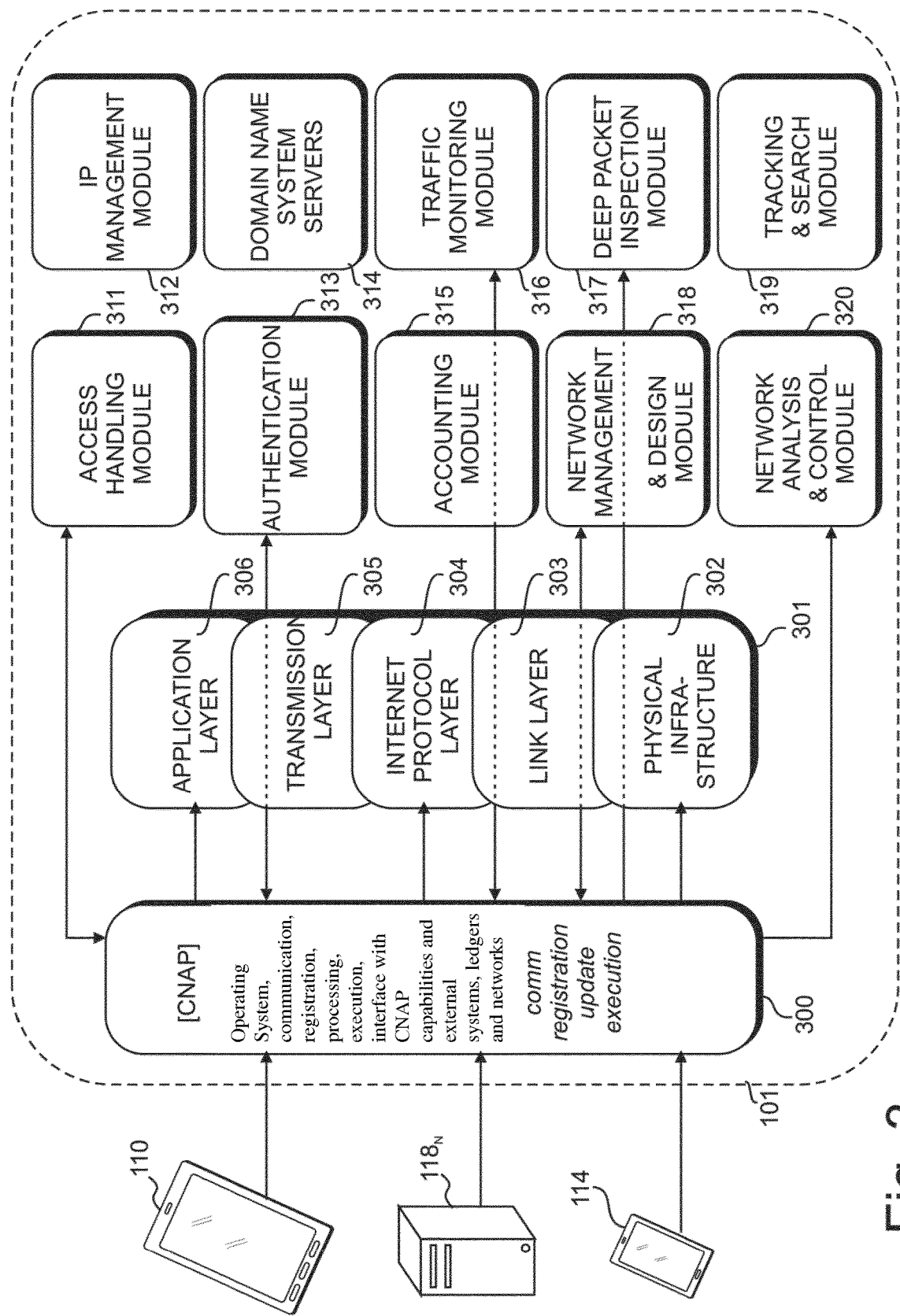
FIG. 3 depicts an overview of the exemplary capabilities of the core network access provider, carried out across a protocol stack of the network of FIGS. 1 and 2 in respect of each access-requesting node.

FIG. 3 depicts an overview of exemplary capabilities of a core network access provider 101, a receiver and storer of computer programs to design networks and systems on or attached to the network carried out across a protocol stack 301 of the network of FIGS. 1 and 2 in respect of each access-requesting node $110_N$, $114_N$, $116_N$, $118_N$, $140_N$. A foundational aspect of the present invention that is an intrinsic part of the network architecture is an identification protocol and distributed ledger 150 as well as a CNAP that is able to monitor and control the network. Thus, CNAP can be viewed as a system and ledger access gatekeeper. The present invention also is concerned with designing systems that use its capabilities to affect the network and the use of it, and thus to enable the design of systems and ledgers that are managed by the CNAP. This is established by merging a specific distributed ledger 150 described herein with the network protocol 301 of a Wide Area Network system based on communication addresses/socket addresses such as e.g. within the TCP/IP context, and using the CNAP 101 that provides hardware and software access to the communication network as the reference node that grants and secures access to ledgers and systems thereon according to a pre-set design of the different systems.

A CNAP 300 is configured for external communication for receiving and interfacing with data programs and ledgers. It is configured for registration and implementation of programs and operating systems that interface with at least the access system and one or more of the network function capabilities. A CNAP 101 must accordingly interface operably with each layer of the network protocol stack 301: the base physical 'hardware' infrastructure layer 302, the link layer 303 interfacing digital signalling content with the base layer 302, the internet protocol 'IP' layer 304 governing the format of data signalled over the (Internet) network, the transmission layer (Transmission Control Protocol, TCP) 305 providing host-to-host communication services for applications 140, and the application layer 306 providing process-to-process communications communication services for applications 140. This network protocol stack and layer design is described for exemplary purposes and the invention may use other network designs.

A CNAP 101 must also accordingly comprise one or more of the following attributes and their respective functionalities embodying network management capabilities: an access handling module 311 to process and grant or deny network access requests of remote nodes, and control their access after grant; an IP management module 312 to control a pool of network address and polled by the access handling module 311 to assign a network address to any access-requesting, authenticated node; an authentication module 313 to control registration of nodal and user unique parameters $U_{PARAM}$ and polled by the access handling module 311 to verify the credentials of any access-requesting node; a Domain Name System module 314 associated with a tracking and searching module 319 for locating and identifying nodes in the core network based on their assigned network addresses and controlled by the access handling module 311 to control and, as the case may be, block nodal communications; an optional accounting module 315 for managing subscriptions and processing electronic payments by registered users; a traffic monitoring module 316 associated with a deep packet inspection module 317 for detecting network communication contents and, in particular, identifying malware, viruses, spam or such other nefarious networking activity; a network design and management module 318 to monitor and update or otherwise modify the qualifying core network access provider attributes, comprising a predetermined set of hardware attributes, software attributes, communication attributes and one or more Condition of Service (CoS)-oriented rulesets collectively embodying the conditions for obtaining access to the core network and registered systems in the CNAP 300 such as an ID ledger or a specifically designed network or access database; and an optional network analysis and control module 320 to monitor and update or otherwise modify the core network attributes, comprising a predetermined set of hardware attributes, software attributes, communication attributes and one or more Quality of Service (QoS)-oriented rulesets collectively defining the optimal bandwidth and use thereof within the core network.

Every access and use of systems within the core network must comply with preset criteria at all times: the CNAP 101 can use all its possible tools 311-320 to tag, track, block and do anything else with a user terminal, network communication, connected database or other network activity. The core network and/or the identifier ledger 150 (or indeed any other system that the CNAP is certified to give access to) can be designed with whatever suitable access conditions for whatever type of organizations and users that a system designer finds suitable. For example, a third party may operate together with the CNAP 101 and grant access for a user through the CNAP 101 e.g. a bank granting access to a payment ledger for a costumer.

A CNAP 101 can stop a user from accessing the open network by demanding authentication and/or compliance with certain predesigned network, ledger or system policies and conditions implemented by the CNAP modules 311-320 according to conditions of the distributed system or ledger, conditions of the specific network system or ledger which is in the form of a data program or operating system communicated to and installed in the CNAP (300). For example, a regulator or government may want to stop users from accessing unregulated and anonymous financial block chain ledgers (block chain based cryptographic currency), that can be used for financing terrorism, drugs, trafficking or other illegal activities, wherein the network design and management module 318 specifies such unregulated and anonymous financial block chain ledgers in a relevant blocking ruleset executed by any one, or combination of the network altering capabilities (such as for example circuit switched network hardware, traffic monitoring module jointly with DPI, blockage of the specific systems, sources, links and communication, only whitelisted (positively defined) communication allowed), and the traffic monitoring module 316 jointly with the deep packet inspection module 317 inspects nodal activity to detect data packets corresponding to the blocked block chain ledgers.

Figure 4:
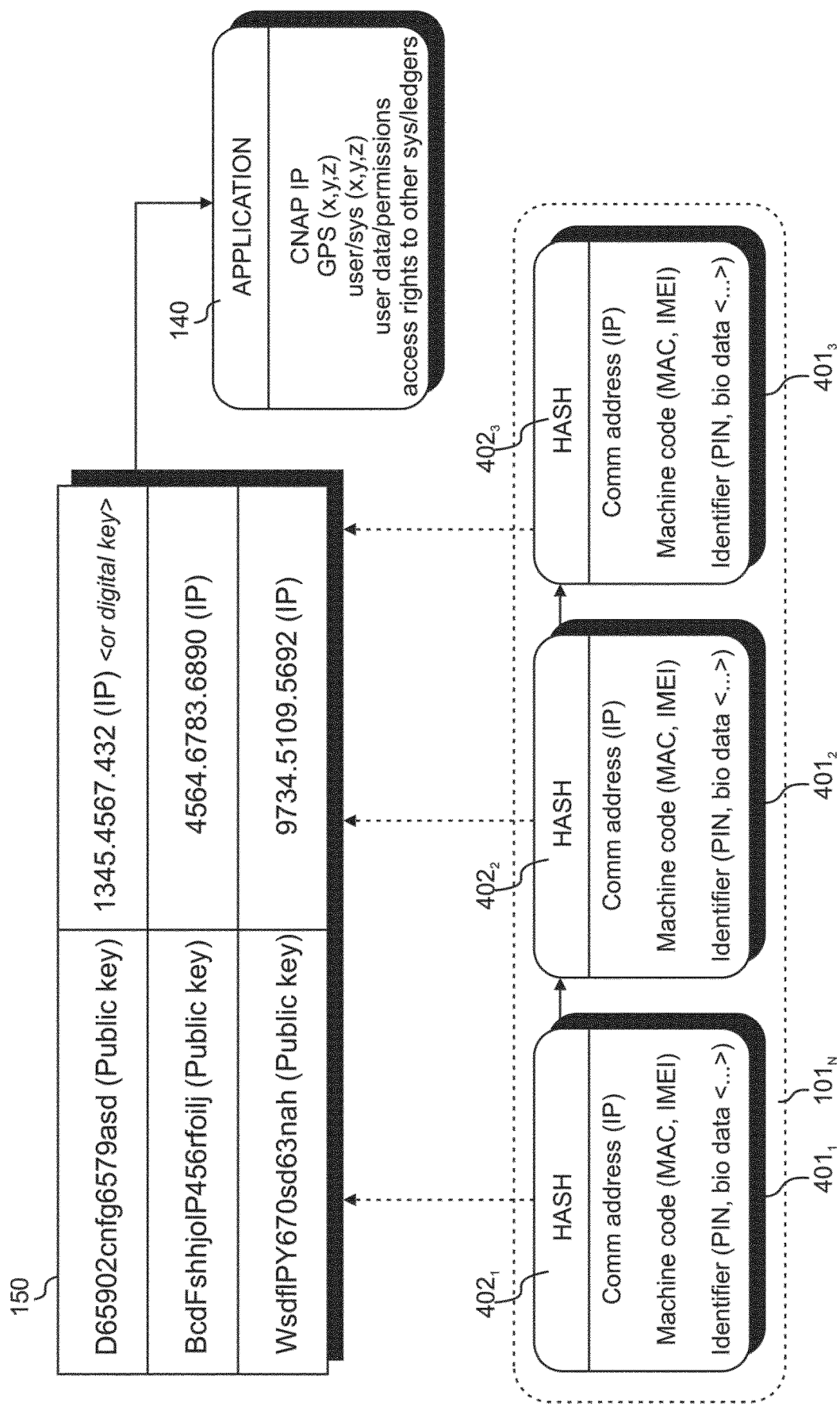
FIG. 4 shows an example integrity identifier ledger according to the invention, maintained by the core network access provider and the network-connected nodes in the network of FIGS. 1 to 3.

FIG. 4 shows an example integrity identifier ledger according to the invention, maintained by the modules 311-320 of the core network access provider collaboratively with the network-connected nodes $110_N$, $114_N$, $116_N$, $118_N$, $140_N$ in the network of FIGS. 1 to 3.

The integrity identifier ledger 150 is a distributed ledger used by each network-connected node $110_N$, $114_N$, $116_N$, $118_N$, $140_N$ in the network, as a single digital identity that can be used in all data processing environments accessible through the core network, wherein identification for the node user is required, examples of which include for instance database access rights, electronic payment procedures, electronic voting procedures, electronic contract signing and protection of nodes.

In the specific example of FIG. 4, a network-connected application node 140 is for instance a travel visa application of a government office, requiring identification of the user of any connected user device $110_N$, $114_N$, $116_N$, $118_N$ applying for a visa electronically. Identification can be shown to peruse the application of the users authenticity through the integrity identifier ledger 150. The integrity of the components, sequence and process of the unique ledger entries $401_N$ must be verified to be established, and each encoded as a public key based on the underlying physical IP address at the CNAP 101 by deriving a digital signature or cryptographic number for each core network address or other identifier assigned to a node.

According to the methodology described herein, the encoding of unique parameters $U_{PARAM}$ of each network node $110_N$, $114_N$, $116_N$, $118_N$, $140_N$ as a node-respective ledger record or entry $401_N$ in the identifier ledger 150 by the CNAP 101, sequentially to those respective of the immediately-previous node $110_{N-1}$, $114_{N-1}$, $116_{N-1}$, $118_{N-1}$, $140_{N-1}$ to be granted access to the core network incorporated as the previous node's own unique ledger record or entry $401_{N-1}$, is inherent to the core network access granting procedure carried out by the CNAP 101. The underlying reality of e.g. a MAC, IP address and/or other technological identifier of a node is cryptographically derived, synthesized, hashed and/or attached to an identifier, so that a potential change in the physical network protocol, socket address, port number, or other underlying information of a node will be visible on the identifier ledger 150. In an alternative embodiment, the CNAP capabilities can detect any changes in the underlying physical environment that is not compliant with the ledger and alert the ledger and its connected CNAPs, and take appropriate action in own systems. This process and actions can be done automatically as the breach is detected.

An identity and its communication address do not need to be changed, so there is a limited number of transactions to record in the identifier ledger 150, and correspondingly limited signaling in the network associated with distributing the identifier ledger 150. Changes occur when new identities are registered with new communication addresses, when a communication address changes identity, when a user breaks underlying physical characteristics that result in a broken identity (e.g. logging out or hacked by another entity), when a node crosses a network boundary resulting in a change of access-providing CNAP and network address, or if a user changes its CNAP and receives a new IP, or if addresses are changed (e.g. proxied) to disguise the identity and/or location of individuals or organisations or when an identity is hacked and the IP is taken by an unauthorized user.

For embodiments of the identifier ledger 150 based on block chain technology, also illustrated in FIG. 4 with the adjunction of a hash $402_N$ of the encoded unique parameters $U_{PARAM}$ of each node, there is also a limited processing overhead associated with proof-of-work block chain auditing, due to the finite number of core network addresses assignable by the CNAP 101 which, at its highest, is equal to the accurate number of identities on the ledger 150 (an ID may have multiple IP addresses). Furthermore, since it is the actual change in the ID or IP that is relevant to the CNAPs or other ledger attached nodes, the proof of work is not that crucial for the immediate key breach function, because the purpose is to detect "any spending", rather than just "double spending".

As an assigned network address and identification data is made compliant with the system at the time of recordal in the identifier ledger 150 by the CNAP 101, the integrity of the register is irreversible as it is distributed: data derived from the underlying physical factors is hashed into the chain and so cannot be breached without it becoming apparent for all nodes attached to the ledger. All nodes and processing units in the core network can process the proof of work independently of the others and do not need consensus, because any change or variation in the encoded user identifier or in the encoded physical factor of the node (e.g. MAC, IMEI), invariably destroys the ledger record key, e.g. if the communication address shifts, if the underlying physical value of the communication address, the machine address, or other identifier becomes inaccurate, relative to those hashed with the information locked by the CNAP 101 into the distributed ledger 150. Those with access to the ledger can be certified CNAPs only, or also all connected nodes, or connected access databases and other systems that have to be notified about a potential key breach immediately. It should be noted that it is not necessary to rely on the longest chain of proof of work. First and foremost the CNAPs or other connected nodes must be able to receive information on any breach and react automatically according to the preset actions to be taken upon key breach (for example deny access for a user in an access database, terminate network connection for the ID and the IP in a network, etc).

These aspects of the present invention contribute to the improved scalability of the core network architecture and provide an optimum balance between privacy and accountability.

In block chain ledgers, transactions are time-stamped and hashed into a block that is verified to contain accurate information. The proof of work requirement cannot be changed, unless it is changed in all the following blocks time-stamped after and on all the connected nodes that have a copy of the block chain. To prevent double-spending and accommodate the need for trusted third parties, the sequence of transactions is proven by the network's gathered and best computer processing power able to produce the longest chain, which is taken as proof of work when a user returns to the network. If hostile actors control a majority of a network's processing power and are able both to change proof of work and catch up and surpass the network's legitimate processing power, the chain, its sequence and registered values can all become incorrect.

With the identifier ledger 150 of the invention, connected network nodes can permanently witness all access and ledger record activities, and thus do not return to the chain, nor have any need to. Indeed, an embodiment considers the alternative of there being no block, but only a sequence of events that is continuously time-stamped and registered on the ledger. Moreover, double spending and the exact sequence of transactions of communication address between users are also non-critical, because the first change in a record 401 is of the most interest to the connected nodes. In this regard it should be understood that all of the changes can be relevant to have control on users and identities, but the crucial part in order to protect a database or network is to react immediately to the first change.

This approach thus implements unique identity and recurring traceability and accountability for each network-connected node across the core network, wherein any changes in that unique ledger record or entry $401_N$ over time during the node's network session immediately contravene the ledger's integrity as updated by the CNAP, are immediately detectable by the nodes' own integrity checking of the ledger 150, and automatically result in the CNAP 101 terminating the network session and/or blocking traffic for the node associated with the changed ledger entry 401, or indeed other activities such as like surveillance of the IP address or identity in the network by a relevant CNAP, or other activity from connected node (e.g. like an access database terminates access for a user).

Figure 5:
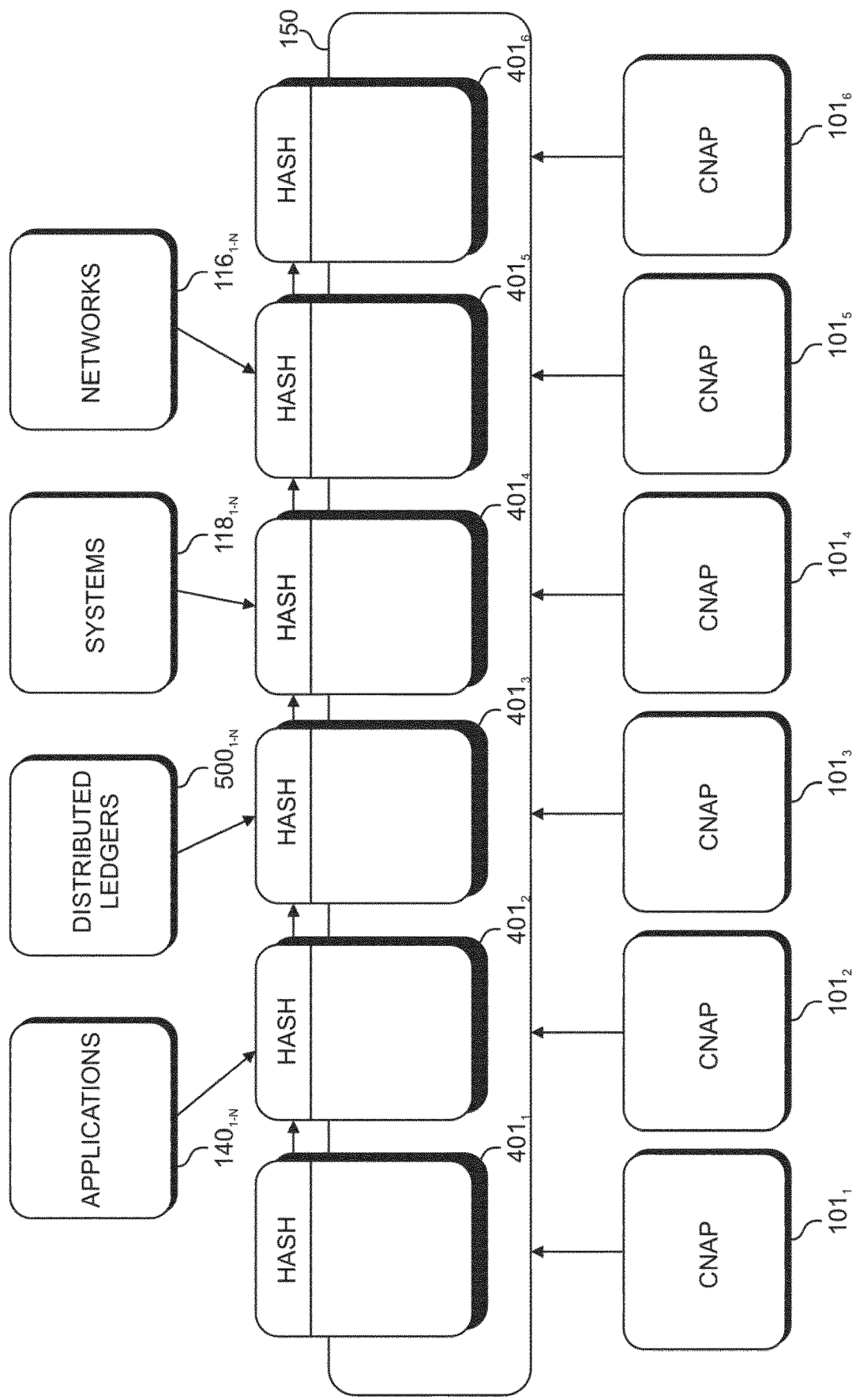
FIG. 5 illustrates scaling of the network architecture and the integrity identifier ledger thereof across a plurality of core network access providers and its interface with other systems, networks, ledgers and applications.

FIG. 5 illustrates how the network architecture and the integrity identifier ledger 150 thereof scales across a plurality of core network access providers $101_{1-6}$, wherein applications $140_{1-N}$, distributed ledgers $500_{1-N}$, distributed systems $118_{1-N}$, sub-networks $1116_{1-N}$ can all use the identifier ledger 150 and a network of connected CNAPs $101_{1-6}$ as a mediator for interoperation of multiple systems and nodes.

In the embodiment shown in FIG. 5, a plurality of CNAPs $101_{1-6}$ functions as a unified gatekeeper for controlling access from users and things 110-112-114, systems 116-118, databases 120, applications 140 and other connected ledgers 500 as nodes, to other similar users and things 110-112-114, systems 116-118, databases 120, applications 140 and other connected ledgers 500.

Each CNAP individually controls access to the core network for its registered users and their respective nodes, and records its respective network access grants in the identifier ledger 150. Access rights attached to a user by a CNAP $101_1$ can follow the user across discrete areas and nodes of the core network, by being be made transparent to other CNAPs$_{2-6}$ through encoding in the common identifier ledger 150, but access to the core network for any node may likewise be stopped by any CNAP $101_{1-6}$.

Some block chain-based or other distributed ledgers 500 ledgers, systems 118, applications 140 and discrete network areas 116 may be made inaccessible by each or all CNAPs $101_{1-6}$ through respective rulesets registered implemented and verified in the CNAP 300 and processed by their respective modules 301-320, whilst maintaining their common tasking of forcing identification and recording same in the integrity identifier ledger 150 for granting and maintaining network access rights or rights to other systems that are registered and implemented in the CNAP 300.

Figure 6:
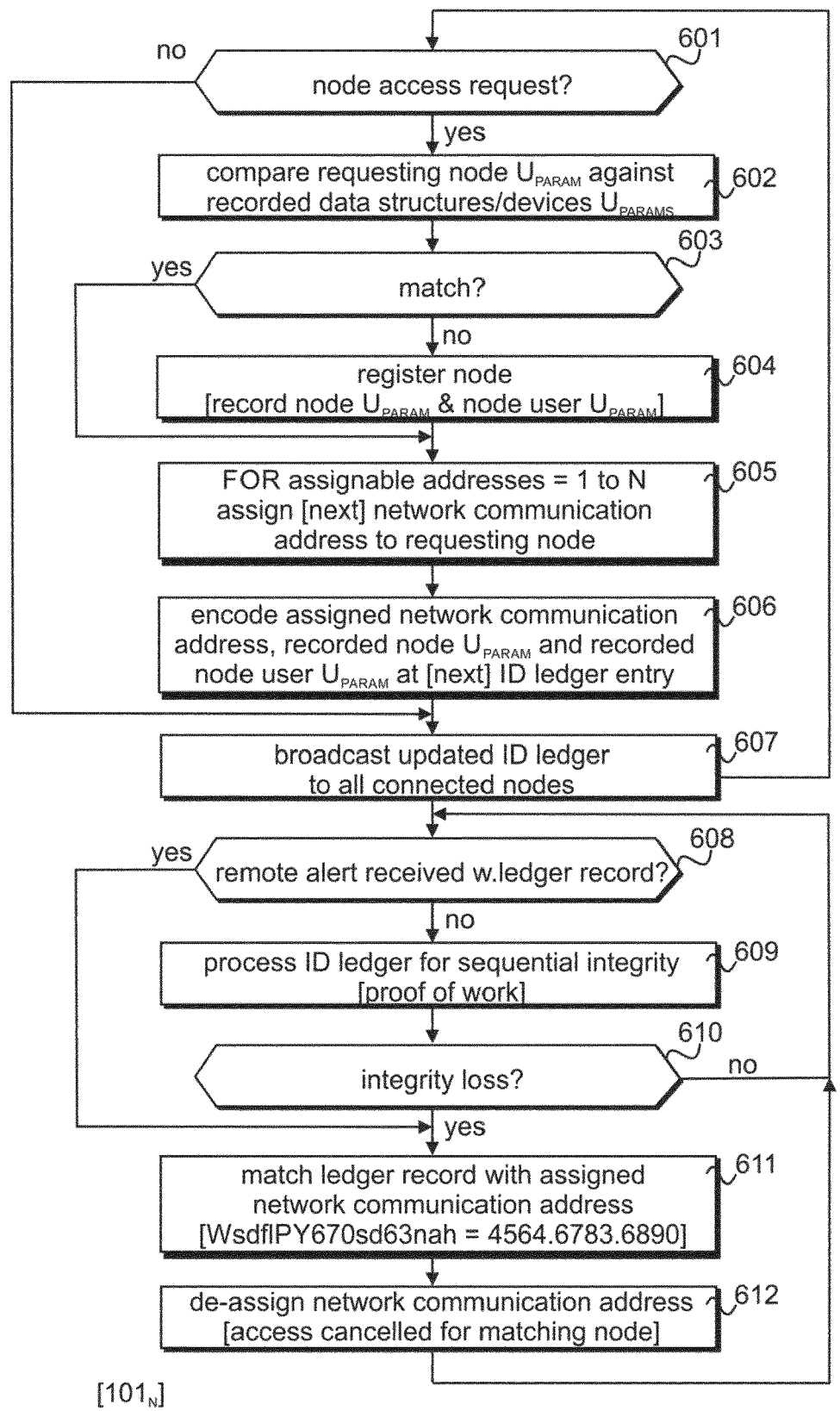
FIG. 6 is a logic diagram of an embodiment of the methodology implementing the network architecture of the invention, carried out at a core network access provider.

FIG. 6 is a logic diagram of an embodiment of the methodology implementing the network architecture of the invention, carried out at a core network access provider.

At step 601, the CNAP 101 considers whether a network access request is pending from a remote node e.g. 110, which encodes a variety of node data including at least one parameter $U_{PARAM}$ representative of a unique device identifier, for instance a MAC address or IMEI code. In the affirmative, at step 602 the CNAP 101 processes the network access request to decode and then compare the unique parameter $U_{PARAM}$ against stored unique parameters $U_{PARAM}$ of nodes registered at the CNPA 101.

At step 603, the CNAP 101 considers whether the comparison has returned a match. In the negative, at step 604 the CNAP 101 processes the network access request as a first request by an unregistered node and proceeds to register the requesting node for storing both its unique parameter $U_{PARAM}$ and a unique user parameter $U_{PARAM}$ to associate therewith. Step 604 preferably involves a registration procedure requiring the user of the requesting node 110 to submit a proof of identification which, or a part, reference or aspect of which, may then be recorded as the unique user parameter $U_{PARAM}$.

Thereafter, or alternatively when a match has been returned at step 603 which identifies the requesting node 110 as a registered node, the CNPA 101 assigns the next available network address in a finite pool of assignable core network addresses to the requesting node 110 at step 605. At step 606, the CNAP 101 encodes the communication address respectively assigned to the node 110 and its respective authenticating parameters including its registered unique parameter $U_{PARAM}$ and registered unique user parameter $U_{PARAM}$ in the identifier ledger 150. as the sequentially-next entry therein. The CNAP 101 next broadcasts automatically upon registration the identifier ledger 150 containing the updated entry to all the nodes $110_N$, $114_N$, $116_N$, $118_N$, $140_N$ connected to the core network, including any other CNAPs $101_N$ also connected thereto. Thereafter, control returns to the question of step 601 in order to process a next access request of a next node $110_N$, $114_N$, $116_N$, $118_N$. It should be noted that the ledger can be distributed to all users, but it is not necessary. It can be distributed only to the certified CNAPs. It can also be distributed to other connected systems and databases that need to know the real time integrity of an ID. It is important that the different ledgers and systems can design permissioned access to their systems. They can set conditions to the users and also set conditions to who will get access to the information of the ledger (the CNAP can for example have an opportunity to give permissioned access to its users on certain conditions set by the system through the data program implemented in the CNAP 300 and the system can also have permissioned access to the information of the ledger).

In parallel with the network access controlling functionality and the node authentication inherent thereto, described with reference to steps 601 to 607, as a node itself of the core network, the CNAP 101 also verifies the integrity of the identifier ledger 150 in order to identify invalid ledger records corresponding to nodes with authenticating parameters lapsed since the encoding of step 606 and, as a gate-keeping node of the core network, to enforce the integrity by cancelling network access for any node so identified.

Accordingly a second processing thread of the CNAP 101 runs concurrently with the network access controlling functionality of steps 601 to 607, wherein a question is asked at step 608, about whether an alert has been received from a remote node comprising an invalid ledger record. If the answer is negative, then at step 609 the CNAP 101 processes the identifier ledger to verify its integrity, for instance by processing the encoded ledger with a known proof-of-work algorithm. Advantageously, owing to the finite number of assignable core network addresses, the processing overhead associated with step 609 remains relatively modest, relative to integrity ledgers, whether of the block-chain type or other, the number of entries for which are not constrained or limited, and are known to grow significantly non-trivial in numbers, for instance in the specific field of currency transactions. A question is next asked at step 610, about whether the verification step has output an invalid ledger record. If the answer is negative, then control returns to the question of 608, wherein the verification thread continues to check the integrity of the identifier ledger 150 uninterruptedly, so long as a remote alert has not been received. It should be understood that any change is immediately alerted and the CNAP has pre-set and automatic actions to the information based on which user it concerns and what system this user is relevant for (these actions and procedures are registered and implemented in the CNAP 300).

Should a remote alert be received and answer the question of step 608 positively or, alternatively, should the CNAP 101 identify an invalid ledger record locally at step 609 and answer the question of step 610 positively, then at step 611 the CNAP 101 identifies the node $110_N$, $114_N$, $116_N$, $118_N$, $140_N$ corresponding to the invalid ledger record and matches it to the core network address which it last assigned to that node. If the alert is received due to a key breach and change in the ledger (which can be triggered by the physical change of the underlying status), the CNAP can be programmed to take immediate relevant action related to the identifies and addresses involved with the change in the ledger. The CNAP 101 may for instance extract and decode the encoded core network address, match the decoded core network address to the node's registered unique parameter $U_{PARAM}$ and unique user parameter $U_{PARAM}$, and compare the registered authenticating parameters with those encoded in the ledger record deemed invalid, to validate its invalid character. At step 612, the CNAP 101 de-assigns the core network address from the node 110, dissociating the previously-assigned core network address from that node's registered unique parameter $U_{PARAM}$ and unique user parameter $U_{PARAM}$, wherein that node's connectivity to the core network is automatically severed and wherein the de-assigned address returns to the pool of assignable network addresses available for a next requesting node at step 601. Control subsequently returns to the question of step 608.

Figure 7:
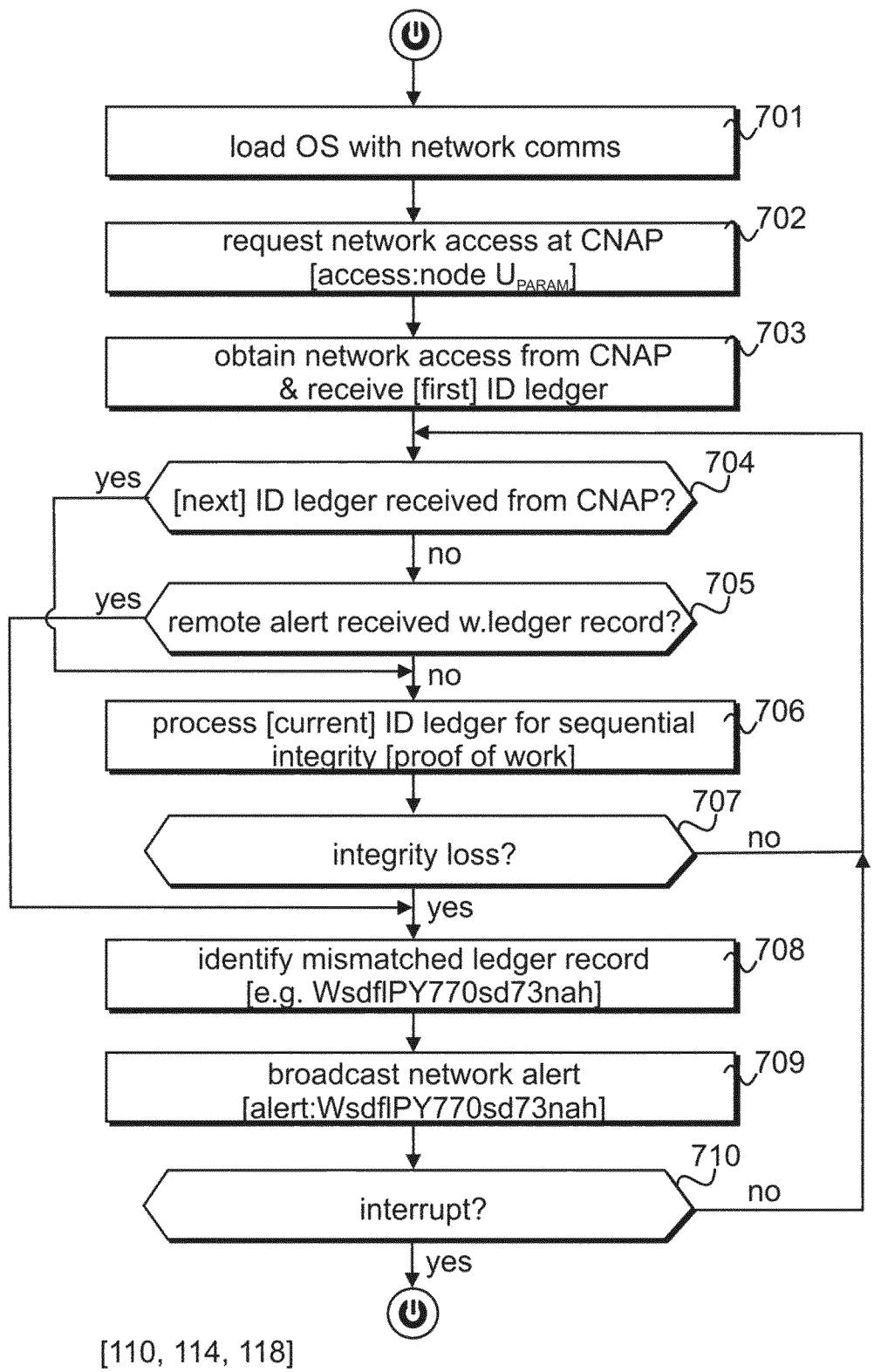
FIG. 7 is a logic diagram of an embodiment of the methodology implementing the network architecture of the invention, carried out at each node in the network.

FIG. 7 is a logic diagram of an embodiment of the methodology implementing the network architecture of the invention, carried out at each node $110_N$, $114_N$, $116_N$, $118_N$ in the network. Each node initially requires powering up and, conventionally at step 701, configuring with an operating system comprising instructions for governing the basic data processing, interdependence and interoperability of its hardware components, including data communication sub-routines to configure the node for bilateral network communication via one or more relevant interfaces ultimately connected with a router $131_N$ or base station $138_N$. At step 702, the node requests core network access or access to a system at the CNAP 101 and includes at least its node unique parameter $U_{PARAM}$ in the request. Adverting to steps 601 to 607 described herein, the node obtains access to the core network after it is assigned a core network address by the CNAP 101, and receives a copy of the identifier ledger 150 from the CNAP, at step 703.

So long as the node remains connected to the core network, a next routine both updates the node as to further remote nodes connecting to the core network over time, and assists the CNPA 101 with the task of maintaining the integrity of the identifier ledger 150 collaboratively, by processing the identifier ledger to verify its integrity, for instance by processing the encoded ledger with the same known proof-of-work algorithm as the CNAP 101.

A question is accordingly asked at step 704, about whether the node has received a next version of the identifier ledger 150, relative to the version previously received at step 703. If the question is answered negatively, a next question is asked at step 705, about whether an alert has been received from a remote node comprising an invalid ledger record. When the question of step 705 is answered negatively or, in the alternative, when the question of previous step 704 is answered positively and a next version of the identifier ledger 150 has been received, the node processes the identifier ledger to verify its sequential integrity at step 706, for instance by processing the encoded ledger with the same proof-of-work algorithm as the CNAP at step 609. A question is next asked at step 707, about whether the verification step has output an invalid ledger record. If the answer is negative, then control returns to the question of 704 to check for an updated identifier ledger 150, wherein the verification thread continues to check the integrity of the identifier ledger 150 uninterruptedly, so long as a remote alert has not been received and sequential versions of the identifier ledger 150 are received.

When the question of step 707 is answered positively or, in the alternative, when the question of previous step 705 is answered positively and an alert has been received, the node identifies the mismatched ledger record out of the identifier ledger at step 708 which, having regard to the integrity of the character, sequence and process of nodal parameters encoding in the ledger, may in one embodiment consist of selecting the record having a mismatching assigned network address (or digital key representative of same) relative to its earlier iteration or compared to the actual status in the core network constantly monitored and detected by a CNAP in the previous iteration of the ledger. At step 709, the node broadcasts an alert comprising the mismatched ledger record as an invalid ledger record to all nodes connected to the core network, thus including the CNAP 101 which shall process same according to steps 608 to 612.

A question is subsequently asked at step 710, about whether the user of the node has input an interrupt command to cease operating the node, whether in a connected mode to the core network or entirely. When the question of step 707 is answered negatively, control automatically returns to the question of step 704, checking for a next version of the identifier ledger 150 to verify. Alternatively, the question of step 707 is answered positively and the user may eventually switch off the computing device embodying the node.

With this method carried out at each connected node, advantageously the nodes in the core network can trust their own proof of work and, for the purposes of detecting an identity breach, each node can rely upon its own assessment of the history, sequence and identifiers of the identifier ledger 150 and does not need to rely upon what is verified by a remote node with best computer processing power, nor whether other nodes concur on a change in the ledger or not, but simply remit the verification to the CNAP 101, having fulfilled its de-centralised nodal change detection task.

Figure 8:
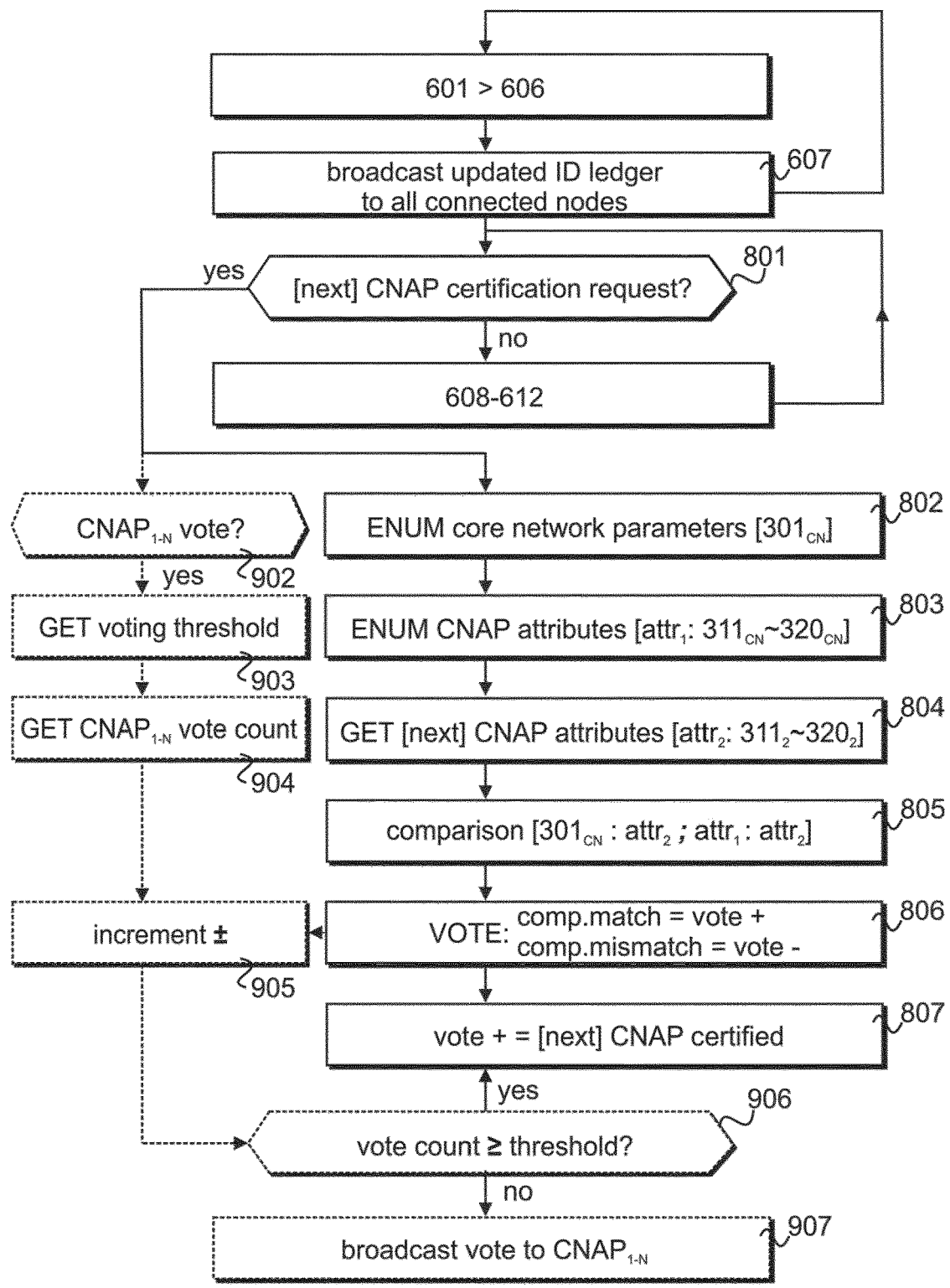
FIG. 8 is a logic diagram of two alternative embodiments of the methodology implementing the network architecture of the invention, carried out at a plurality of core network access providers in the network.

FIG. 8 is a logic diagram of two alternative embodiments of the methodology implementing the network architecture of the invention described with reference to FIG. 6, carried out at a plurality of core network access providers in the network, wherein like reference numerals relate to like data processing steps. Both embodiments constitute further processing threads running concurrently with the network access controlling functionality and the node authentication inherent thereto, described with reference to steps 601 to 607, and the identification and core network address de-assignment of invalid ledger records, described with reference to steps 608 to 612.

In a first alternative embodiment, a question is asked at step 801 after each broadcast of a next version of the identifier ledger 150 of step 607, about whether the CNAP 101 has received a certification request from a remote node $110_N$, $114_N$, $116_N$, $118_N$ in the network. If the question of step 801 is answered negatively, control returns to the node access request question of step 601. Alternatively, when the question of step 801 is answered positively, a remote node is electing to be certified as a CNAP $101_{N+1}$ and is a candidate CNAP soliciting a certificating vote by the request-receiving, voting CNAP 101.

At step 802, the voting CNAP 101 looks up the qualifying core network parameters, in the example characteristics $301_{CN}$ of the core network protocol stack which the candidate CNAP is expected to fully interface with.

At step 803, the voting CNAP 101 looks up the qualifying core network access provider attributes $attr_1$, in the example a predetermined set of hardware attributes, software attributes, communication attributes and one or more rulesets as described with reference to functional modules $311_{CN}$-$320_{CN}$ of the CNAP 101, and which the candidate CNAP is expected to fully implement and replicate for carrying out the gate-keeping role of a CNAP in the network. The verification procedure of securing a CNAP's compliance with system/ledger conditions and functionality set by the data program that is installed in the CNAP 300 can be open source, in order to ensure transparency in compliance. Real time testing of the automated procedures for providing users access and responses to identity breach can also be performed.

At step 804, the voting CNAP 101 obtains the nodal attributes $attr_2$ from the candidate CNAP, in the example the specific hardware attributes, software attributes, communication attributes and one or more rulesets $311_2$-$320_2$ of the candidate CNAP and, at the next step 805, compares them against the enumerated core network parameters $301_{CN}$ and the enumerated CNAP attributes $attr_1$ both for compatibility and functional identity. In another embodiment, the verification process is performance based and effectuated through a testing of the new CNAP and the proper function of its systems.

The voting CNAP 101 formulates its vote at step 806 as a function of the output of the comparison step 805, wherein no vote is output (by way of a negative vote) when one or more of the attributes $attr_2$ of the candidate CNAP do not match the qualifying core network parameters $301_{CN}$ and the qualifying core network access provider attributes $attr_1$ and, conversely, a positive vote is output when the attributes $attr_2$ of the candidate CNAP fully match the qualifying core network parameters $301_{CN}$ and the qualifying core network access provider attributes attn. Alternative embodiments may consider outputting a positive vote upon step 805 outputting only a partial match, for instance based on matching only prioritised or weighed attributes relative to optional or lower-weighted attributes.

Upon a positive vote, the voting CNAP consequently certifies the candidate CNAP 101 as a CNAP $101_{N+1}$ at step 807, wherein the certified CNAP $101_{N+1}$ may then carry out the gate-keeping function as described herein, in particular with reference to FIG. 6 herein, in parallel to and in tandem with the voting CNAP, effectively sharing the network access control processing overhead. In the no-vote alternative, the candidate CNAP 101 remains uncertified.

In a second alternative embodiment, shown in the figure in dotted lines by way of contrast with steps 801 to 807 of the first alternative embodiment, the voting requirement in the core network of the invention is distributed amongst a plurality of CNAPs $101_{1-N}$, wherein a candidate CNAP $101_{N+1}$ shall receive either a majority vote or a unanimous vote from all voting CNAPs $101_{1-N}$, and each voting CNAP 101 shall carry out a certification of the candidate CNAP $101_{N+1}$ substantially as described with reference to steps 801 to 807 above.

This second alternative embodiment may usefully be combined with the first alternative embodiment described above, upon a first CNAP 101 certifying a second CNAP 101 as described with reference to steps 801 to 807, wherein the core network thus comprises at least two voting CNAPs $101_{1,2}$ apt to output either a unanimous vote or a split vote about a next candidate third CNAP $101_3$.

In this second alternative embodiment, when the question of step 801 is answered positively and a CNAP certification request has been received from a remote node $110_N$, $114_N$, $116_N$, $118_N$ in the network, a question 902 is also asked about whether a voting requirement is to receive independent certificating votes from peer CNAPs. If the question of step 902 is answered negatively, control returns to the sequence of steps 802 to 807.

In the alternative, when the question of step 902 is answered positively, control is split between the sequence of steps 802 to 807, which proceeds independently for processing the CNAP's own vote in respect of the requesting node, and a remote vote-collating logic which, at step 903, begins by looking up the applicable voting threshold according to the core network ruleset, for instance a predetermined minimum number of votes, or half the number of certified CNAPs 101 in the network plus one in the case of a majority vote, or the total number of certified CNAPs 101 in the network in the case of a unanimous vote. At step 904, the voting CNAP polls the core network for the respective vote decision of each remote peer CNAP to obtain a current vote count.

When the independent voting decision of the voting CNAP 101 is output at step 806, then at step 905 the current vote count of step 904 is either incremented by the CNAP's own vote, if that vote is a certificating vote, or decremented by the CNAP's alternative decision to output a no-vote. A question is next asked at step 906, about whether the incremented or decremented vote count of step 905 meets or exceeds the core network threshold obtained at step 903. If the question of step 906 is answered positively, control proceeds to step 807 and the voting CNAP consequently certifies the candidate CNAP 101 as a CNAP $101_{N+1}$, wherein the certified CNAP $101_{N+1}$ may then carry out the gate-keeping and CNPA-certificating functions as described herein, in parallel to and in tandem with all the other voting CNAPs, effectively sharing the network access control processing overhead still further. In the alternative, when the question of step 906 is answered negatively, the voting CNAP 101 broadcasts its vote decision to its peer CNAPs across the network, each of which may receive it when processing their own vote count at their own instantiation of step 904.

Adverting to the data processing steps described herein, a CNAP 101 is certified for operating and giving access or preventing access to a network and systems connected thereto, if it is compliant with the network's technological and administrative conditions for use, applicable both to the CNAP and its users. Different systems may require different conditions for a CNAP to be certified, which can be related to the functionality and capabilities of one or all the CNAPs to control access to the network and use of the systems connected thereto, and can require deployment of all of a CNAP's attributes to enhance, control and stop options, functionality and activities on the network. A system which a CNAP is required to comply with, can be an open source system, an irreversible integrated on a distributed ledger, or supervised by a third party platform or by another CNAP for integrity and transparency in the implementation process. A code program can also be designed to notify the other certified CNAP's if any code or conditions is tampered with, added to, removed or reorganized. The system can be designed to verify and check and detect changes for other nodes or the system itself to alert about changes in the system before final certification.

The technological compliance of the certification procedure advantageously makes it impossible for a single node or CNAP to tamper with the network architecture and functioning. All the CNAPs 101 that are certified and compliant with the core network attributes and policies can gain information from the identifier ledger and systems connected to the network according to the network architecture specification, and give access to user nodes. The cross-network enforcement advantageously increases for a specific system as more and more CNAPs are certified and comply with conditions of that system, scaling correspondingly across the core network.

A certified CNAP 101 can lose its certification, and correspondingly its ability to provide access to one or more nodes, systems and ledgers if it does not remain compliant with the core network attributes and rulesets, or if its user nodes do not comply with the core network's usage rulesets. This decertification can be automated, by default if, for instance, the CNAP's attributes 311-320 should fail to track updates to the core network attributes and rulesets and the CNAP itself lose connectivity to the core network as a result; or if, for instance, node information in the identifier ledger is also associated with a CNAP identifier and, when an assigned network address or user $U_{PARAM}$ of a node becomes associated with malware, a computer virus, spam or such other nefarious networking activity, the CNAP becomes associated therewith through its identifier.

Figure 9:
FIG. 9 illustrates a first geo-location methodology for each of a plurality of core network access providers.
Figure 10:
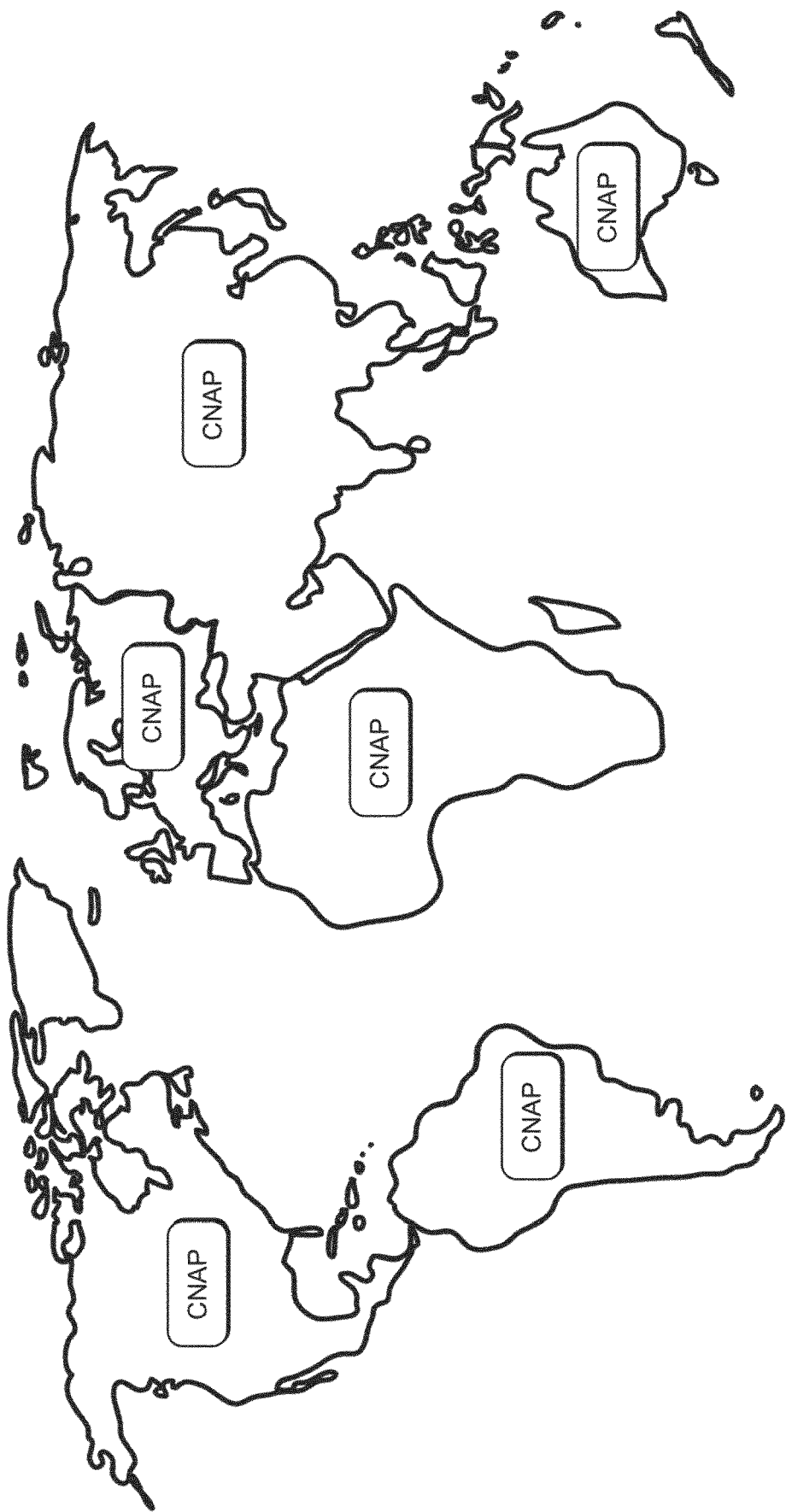
FIG. 10 illustrates a second geo-location methodology for each of a plurality of core network access providers.

FIGS. 9 and 10 illustrate respective embodiments of a core network architecture according to the invention, in each case controlled by a plurality of CNAPs $101_{1-N}$, wherein each CNAP is geo-located, by design through its geographical coordinate attributes and the core network's rulesets, respectively to a Member State of the European Union in the embodiment of FIG. 9 and to a geographical continent in the embodiment of FIG. 10.

In either embodiment, controlling access of a requesting node to the core network at the CNAP comprises geo-locating the node at the CNAP to determine a distance from the node relative to the core network boundary. This procedure may be implemented through a variety of techniques, such as through the registration of an additional node or user unique geo-locating parameter $U_{PARAM(x,y)}$; or a real time geo-location of the node's geographical coordinates, for instance with the tracking and search module 319; or a real time estimation of the node's geographical coordinates derived from either the requesting node's IP address or a node's previously-assigned core network address; or any combination of these techniques. Relevant node geo-locating data may also be registered based on administrative information such as an autonomous system number for a network, a registration with a Regional Internet Registry or other number recourse organization, or parts of the license from a local issuer of a telecommunication license, and more. The aim of the procedure is to determine the node's presence within or outside the geographical scope of the CNAP processing that node's access request, to either grant or refuse the access request.

Accordingly, the present invention provides methods and systems for managing access to a core network through a wide area network, by qualifying its connected users to get access to, or be blocked from, different ledgers and systems that run on or are attached to a core network infrastructure. At least one of the ledgers comprises a system managed by core network access providers, which obtain certification as ledger gatekeepers by complying with technological specifications and gaining a predetermined number of votes from current core network access providers for approving their certification. As and when certified, core network access providers can grant its users access to the identity ledger, if such users comply with the user specifications of the system. The invention thus uses infrastructure, information network protocols, distributed ledgers and connected computing systems to provide an architecture enabling efficient network design for the protection of identity, information, rights, and policies, including a safeguarding mechanism against tampering and other illegal uses of connected systems, in an otherwise uncontrolled environment.

The ledger merges identifiable technological attributes, such as MAC, IMEI, IP address and/or other communication address of a network protocol, with a distributed register of address resources of its users, such as public keys derived from the identifiable technological attributes (MAC, IMEI, etc.) enabling any changes in the status to be immediately transparent in the identity behind a communication address for all nodes with access to the ledger. Other networks, systems, applications, ledgers may interface with the core network qualifying method and the identifier ledger, and users interoperate therewith based on one digital identity, wherein the or each CNAP 101 and the identifier embodies a mediator for all systems and ledgers: the architecture is centered upon the use of one or more CNAPs that controls the infrastructure and access thereto (through air gap paths, link layer block) as the point of pre-qualification and entry for different distributed systems and ledgers, and which records each such entry (devices 110-118, databases 120, systems 116-118) in the identifier ledger 150 using parts of the block chain technology combined with the communication address system to implement a tamper-proof recording and publication of connected nodes to all the nodes, whereby any changes to a node identifier are immediately apparent and notified to all connected nodes. This identifier ledger 150 and the CNAP system 101 can be used as foundation for other systems and can provide interoperability between other ledgers and systems.

With reference to the embodiment described with reference to FIG. 10, an example of a such ledger and platform can be a global system adapted to issue viewing rights and copies based on an original work according to an algorithm set by a rights owner using a distributed ledger, for instance of the block chain type, wherein the rights are enforced through a CNAP ruleset specification and wherein illegal viewing or copying is prevented by only giving access to allowed users that is valid on the identifier ledger record. A rights system specification installed with the CNAP that uses the CNAP capabilities can prevent illegal use and enforce rights across networks for its users. Thus, embodiments of the present invention may be used to design, enforce and control all types of administrative and commercial policies, wherein a CNAP 101 gate-keeps access to, and compliance with, policy- and other regulatory-implementing networked systems.

For example, a national currency transactions ledger may be directly accessed through the CNAP access system. Such a currency may be issued with quantity or volume units that is registered on the currency ledger, according to the policy of for example a local central bank and the quantity may be transparently registered on a distributed ledger. A currency may use a data-program that executes the currency issuing policy based on an algorithm and/or input from external sources, and it may be implemented in, or interfaced with the CNAP. Different national, foreign or global applications and ledgers, e.g. multiple distributed ledgers controlling different currency's may interoperate through the identifier ledger 150 that provide a secure identification across all the ledgers/currency's and where value from multiple attached systems and ledgers may be associated with, and irrevocably attached to, different identities registered on the identifier ledger 150. Illegal transactions and/or currencies can be prevented by the regulatory system specification that uses the CNAP capabilities to enforce policy's and prevent transactions between users. If a user has an invalid identifier ledger record or is not authorized and identified, transactions to and from such users can be blocked. Signaling, communication, links and the use of applications and systems related to illegal currencies can be prevented by the CNAP. Payment operators, banks and other financial organisations can gain access to the identity ledger 150, to be notified if a user identity is breached.

Likewise, with reference to the example embodiment of FIG. 9, digital passports may be managed both nationally and regionally through co-certified, cooperating $CNAPs_{1-N}$ to maintain user privacy and accountability, through granting and blocking access to different systems and ledgers based on specified access conditions, and wherein an invalid record arising in the identifier ledger 150 causes an identity breach notification. Geographical borders may also be specified technically, and their crossing be denied, through the CNAP access system.

Such embodiments can provide efficient borders around geo-located digital data processing systems such as databases, systems and cyber borders. Nodes $110_N$, $114_N$, $116_N$, $118_N$ with access to the identifier ledger 150 may be conferred an automatic interface with CNAP capabilities, including network management tools to mitigate communications of a node deemed to constitute an identity breach. In such embodiments, the requirement for user personal information $U_{PARAM}$ may be adapted to the system specification, wherein the least amount of personal information sufficient to uphold the privacy-securing function of the system is selected. The invention is thus able to provide a system apt to detect an identity breach without having to trust a third party, which is considered especially relevant in the cyber security realm and between governments.

The network architecture of the invention advantageously prevents tampering with the core network and the various nodes connected thereto within the context of an open WAN, for instance via illegal ledgers, through the access and control procedure encompassing physical hardware, circuit switched network and all network capabilities at the CNAP, wherein all users must comply with a system specification that is interfaced with at least the access handler 311 and one or more of the core network functions 312-320 able to alter the functionality and possible use of the core network according to the condition specification of a system.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation, a software implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both. All aspects of the invention can be implemented virtually and on the application layer. The invention can use any type of data processing and communication techniques to serve the purpose of implementing the inventive principles of the present invention.

One skilled in the art will recognize that no computing system or programming language is critical to the practice of the present invention. One skilled in the art will also recognize that a number of the elements described above may be physically and/or functionally separated into sub-modules or combined together.

In the specification the terms "comprise, comprises, comprised and comprising" or any variation thereof and the terms include, includes, included and including" or any variation thereof are considered to be totally interchangeable and they should all be afforded the widest possible interpretation and reciprocally.

The invention is not limited to the embodiments hereinbefore described but may be varied in both construction and detail.

The invention claimed is:

1. A computer-implemented method of providing each node of a network with access to one or more of the network and other nodes and systems connected to the network, wherein the network comprises at least one protocol stack comprising a plurality of layers, the method comprising the steps of:
   controlling real time access to and activity on the network of each layer of the protocol stack by at least one core network access provider, wherein the core network access provider comprises one or more systems;
   sequentially assigning a network communication address of a pool of network communication addresses to each access-requesting node at the core network access provider;
   encoding, for each access-requesting node, the assigned network communication address at the core network access provider with a unique parameter of the node and a unique parameter of an associated node user to form authenticating parameters for the node, in respective ledger records in an integrity identifier ledger;
   distributing the integrity identifier ledger in real time to each network-connected node;
   receiving and processing the distributed integrity identifier ledger at each network-connected node or one or more certified nodes to verify its sequential, identity factor and process integrity;
   upon determining, by the at least one core network access provider, a loss of integrity in the integrity identifier ledger, identifying the ledger record causing the loss and broadcasting an alert comprising the identified ledger record to each network-connected node or one or more certified nodes; and
   upon either identifying a ledger record causing a loss of integrity or receiving an alert at the core network access provider, controlling real time access to and activity on the network for a particular node having the authenticating parameters corresponding to the identified ledger record, wherein the real time access to and activity on the network is controlled on each layer of the protocol stack using one or more capabilities of the core network access provider according to preset criteria associated with the one or more systems of the core network access provider.

2. The method according to claim 1, wherein the step of sequentially assigning the network communication address further comprises matching at least one unique parameter of a data structure or device or at least one unique parameter of a data processing device user with one or more predetermined access parameters.

3. The method according to claim 2, wherein each predetermined access parameter is selected from the group comprising global positioning system (GPS) coordinates, geographical coordinates of network interfacing points, IP addresses or autonomous system numbers issued by regional internet registries (RIR), session keys or authorisation tokens issued by application service providers (ASP).

4. The method according to claim 1, wherein the step of encoding further comprises hashing the encoded network communication address, node unique parameter and node user unique parameter, and wherein the integrity identifier ledger is a block chain data structure.

5. The method according to claim 1, wherein the step of encoding further comprises processing the assigned network communication address into a digital signature or a digital key.

6. The method according to claim 1, comprising the further step of certifying at least one network-connected node as a second core network access provider according to a list of predetermined core network access provider attributes selected from hardware attributes, software attributes, communication attributes and a ruleset.

7. The method according to claim 6 wherein, upon the network comprising a plurality of core network access providers, the step of certifying a network-connected node as a further core network access provider further comprises a step of voting to certify the node at each of the plurality of core network access providers.

8. The method according to claim 6, comprising the further step of geolocating each core network access provider.

9. The method according to claim 6, comprising the further step of decertifying a core network access provider when it fails to uphold one or more attributes of the list of predetermined core network access provider attributes.

10. The method according to claim 1, wherein controlling real time access to and activity on the network further comprises cancelling access to the network, wherein cancelling access to the network comprises de-assigning the network communication address of the particular node, wherein access to the network by the particular node is severed, and wherein the network communication address is returned to the pool of network communication addresses.

11. A system comprising:
   at least one core network access provider operably interfaced with individual layers of a plurality of layers included in at least one protocol stack, the at least one core network access provider being configured for receiving information on systems, subnetworks and ledgers attached to a network and controlling real time access of one or more nodes to the network and their activity on the network, wherein the core network access provider comprises one or more hardware systems;
   the one or more nodes connected to the network, wherein each node is sequentially assigned a network communication address of a pool of network communication addresses by the core network access provider when requesting network access, and wherein each node comprises one or more processors; and
   an integrity identifier ledger comprising, for each node, the assigned network communication address encoded therein with a unique parameter of the node and a unique parameter of an associated node user to form authenticating parameters for the node in respective ledger records in the integrity identifier ledger, wherein the integrity identifier ledger is distributed to each network connected node in real time;
   wherein the at least one core network access provider and each of the one or more nodes is further configured to:
   process a received ledger to verify its integrity,
   identify a ledger record causing a loss of integrity, and broadcast an alert comprising the identified ledger record across the network, wherein the at least one core network access provider is further configured to control real time access to and activity on the network for a particular node having the authenticating parameters corresponding to the identified ledger record, wherein the real time access to and activity on the network is controlled on each layer of the protocol stack using one or more capabilities of the core network access provider according to preset criteria associated with the one or more systems of the core network access provider.

12. The system of claim 11, wherein the at least one core network access provider is further configured to verify the accuracy of one or more unique parameter(s) of each node user, and wherein a maximum number of network communication addresses assignable by the at least one core network access provider in the network is equal to a number of identities verified thereat.

13. The system of claim 11, wherein the at least one core network access provider is further configured to process each network communication address assigned to a node into a digital signature or a digital key.

14. The system of claim 11, wherein the unique parameter of a node is selected from the group comprising a media access control (MAC) address, an international mobile equipment identity (IMEI) code, a mobile equipment identifier (MEID) code, an electronic serial number (ESN), an Android_ID hex string.

15. The system of claim 11, wherein the unique parameter of a node user is selected from the group comprising global positioning system (GPS) coordinates, biometric data, a personal identification number (PIN), a password, a passport serial number, a universally unique identifier (UUID).

16. The method according to claim 10, wherein controlling access to the network comprises initiating surveillance of an internet protocol (IP) address associated with the particular node.

17. The system of claim 11, wherein the core network access provider being configured to control real time access to and activity on the network further comprises the core network access provider being configured to cancel access to the network, the at least one core network access provider being configured to cancel access to the network by de-assigning the network communication address of the particular node, wherein access to the network by the particular node is severed, and wherein the network communication address is returned to the pool of network communication addresses.

* * * * *